United States Patent [19]
Chen et al.

[11] Patent Number: 5,551,705
[45] Date of Patent: Sep. 3, 1996

[54] DOUBLE BEADED SPAGHETTI SEAL WITH STIFFNESS INCREASING DEFORMATION BEHAVIOR

[75] Inventors: Colin Chen, Barrington; Keith Madison, Carol Stream; Michael J. Szott, Hanover Park, all of Ill.

[73] Assignee: Fel-Pro Incorporated, Skokie, Ill.

[21] Appl. No.: 501,234

[22] Filed: Jul. 12, 1995

[51] Int. Cl.⁶ ........................................... F16J 15/10
[52] U.S. Cl. ..................... 277/206 A; 277/209; 277/210
[58] Field of Search ..................... 277/209, 211, 277/208, 210, 207 R, 215, 177, 165, 207 A, 206 A

[56] References Cited

U.S. PATENT DOCUMENTS

| | | | |
|---|---|---|---|
| 3,052,478 | 9/1962 | Horvereid | 277/209 |
| 3,333,725 | 8/1967 | Hirata et al. | 277/210 |
| 3,831,950 | 8/1974 | Bentley et al. | 277/209 |
| 5,002,290 | 3/1991 | Pernin | 277/209 |

FOREIGN PATENT DOCUMENTS

| | | | |
|---|---|---|---|
| 66695/90 | 5/1991 | Australia | 277/207 R |

*Primary Examiner*—Scott W. Cummings
*Attorney, Agent, or Firm*—Laff, Whitesel, Conte & Saret, Ltd.

[57] ABSTRACT

A spaghetti seal for use in a surface to be sealed to a confronting surface and having a pair of projecting beads for sealing against the confronting surface. The beads are molded to incline inwardly towards each other or when installed are caused to incline towards each other. Under load, the beads are forced in contact with each other in a controlled manner. When in contact they behave essentially as a single bead to provide increased stiffness and more effective sealing.

9 Claims, 2 Drawing Sheets

5,551,705

DOUBLE BEADED SPAGHETTI SEAL WITH STIFFNESS INCREASING DEFORMATION BEHAVIOR

BACKGROUND OF THE INVENTION

This invention relates to gaskets and more particularly to spaghetti seals adapted to be installed in grooves in confronting parts to be sealed, such as in automotive engines.

Gaskets are composed of various materials, depending on the operating environment in which the gasket is to operate. Chemical compatibility with the fluid being sealed, heat resistance, compressibility, and erosion resistance are just a few of the important factors of the operating environment which should be considered.

One type of gasket, commonly known as a "spaghetti seal", has particular requirements imposed by the operating environment, particularly when used in automotive engines. Spaghetti seals are often used as rocker cover and oil pan gaskets or for flanges that have sealing grooves to seal against splashed oil. They are characterized by their relatively small cross-sectional areas relative to their lengths, hence, their "spaghetti-like" appearance. Further, they are typically very limp and difficult to install. Spaghetti seals are usually inserted in narrow grooves within the surface of a rocker cover or an oil pan (or mating part of an engine assembly), which makes assembly of such seals difficult. Spaghetti seals are frequently formed of molded rubber in order to satisfy the compressibility and shape requirements. It is also important that they be effective to seal, sometimes across gaps that vary along the length of the spaghetti seal.

To enhance the effectiveness of spaghetti seals, plural bead configurations have been used. However, they have not always been effective, especially when the gap to be sealed varies due to flange warpage, bolt hole distribution and the like.

It is therefore an object of the present invention to provide an improved spaghetti-type seal which is effective to seal along its entire length.

SUMMARY OF THE INVENTION

In accordance with the present invention, an improved sealing assembly is provided, such as for use in an automotive engine environment. The sealing assembly comprises a spaghetti seal having an elongated elastomeric body seated and retained in a groove defined in the flange of a first part to be sealed to a second part, such as a pair of engine parts. The groove opens at a surface of the first engine part and is adapted to face the second engine part. The groove has a bottom surface and side surfaces. The elastomeric body has a central body portion and side surfaces, the side surfaces bearing against side surfaces of the groove.

A pair of integrally formed side-by-side upwardly projecting sealing beads of similar size and shape extend upwardly from the central body portion and extend along the length of the body. Each of the sealing beads has a peak extending outwardly beyond the surface of the first engine part, with a first elongated void zone lying between the upstanding sealing beads and along the length of the body. The central body portion confronts and engages the bottom surface of the groove. The beads incline inwardly toward each other to promote, under load, their movement into contact with each other.

In one form, the projecting sealing beads are shaped as molded to incline inwardly relative to each other. In another form, elastomeric body side surfaces define sidewardly projecting ears bearing against opposite groove side surfaces to retain the seal in the groove and to incline the projecting sealing beads inwardly relative to each other.

The elastomeric body, in the regions of the voids, desirably functions as a hinge so that under load, the sealing beads shift into contact with each other to increase the stiffness of the seal. Thus, the void regions facilitate inclination of the sealing beads relative to each other under load to promote their coming into contact with each other.

In a preferred form, a pair of side-by-side feet extend downwardly from the central body portion and engage the bottom surface of the groove, the feet defining, between them, a second elongated void area, the second void area being vertically aligned with the first void zone.

Further objects, features and advantages of the present invention will become apparent from the following description and drawings.

DETAILED DESCRIPTION OF THE INVENTION

Figure 1:
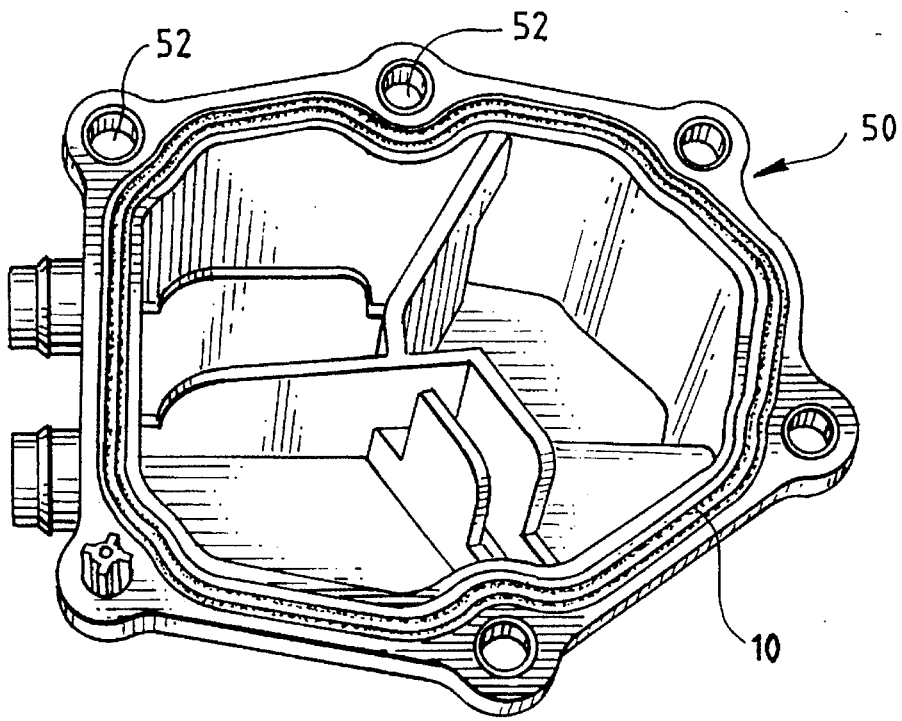
FIG. 1 is a plan view of a spaghetti seal of the present invention installed in the flange of a first engine part.

Referring now to the drawings, and first to FIGS. 1 to 4, a spaghetti seal 10 in accordance with the present invention is elongate and continuous, and is of a generally uniform cross-section along its entire length. Exemplary seal 10 is adapted for use as a oil separator gasket and is mounted in a groove of an oil separator 50. Oil separator 50 is adapted to be mounted via bolts (not shown) which pass through bolt holes 52 and which are threadingly secured in the mating engine part 54. The oil separator may be molded of a plastic such as nylon.

Seal 10 is molded of an elastomeric material such as silicone rubber. Other rubber-like or elastomeric materials may be used as well, of which fluoroelastomers are exemplary. The seal 10 is adapted to be seated and retained in a groove 56 defined in the flange of one of the mating engine parts, such as the oil separator 50.

Groove 56 opens at the surface 58 of the engine part 50 and faces the confronting engine part surface 60. Groove 56 comprises a bottom surface 62 and side surfaces 64.

Seal 10 comprises an elastomeric body having a central body portion and a pair of side surfaces 12. A pair of integrally joined side-by-side, upwardly projecting sealing beads 14 of similar size and shape extend upwardly from the central body portion. The beads 14 extend along the entire length of the seal body. Each of the sealing beads 14 defines a peak 15 which extends from the groove and beyond the surface 58 of the first engine part 50. The sealing beads 14 define a void zone 16 between them. Zone 16 lies between the beads 14 throughout their lengths.

The central body portion also defines a pair of feet 17 which confront the bottom surface 62 of groove 56. Feet 17 have contact portions 18 which initially contact the bottom surface 62. The feet define a void area 19 between them. Void area 19 extends along the length of the seal 10 and lies between the feet 17 throughout their lengths. As may be seen in FIG. 3, the void regions, the void zone 16 and the void area 19, are vertically aligned. As such, they provide a hinge-like function about which the sealing beads 14 may pivot or incline under load, eventually into contact with each other to increase the stiffness of the seal in use.

Figure 2:
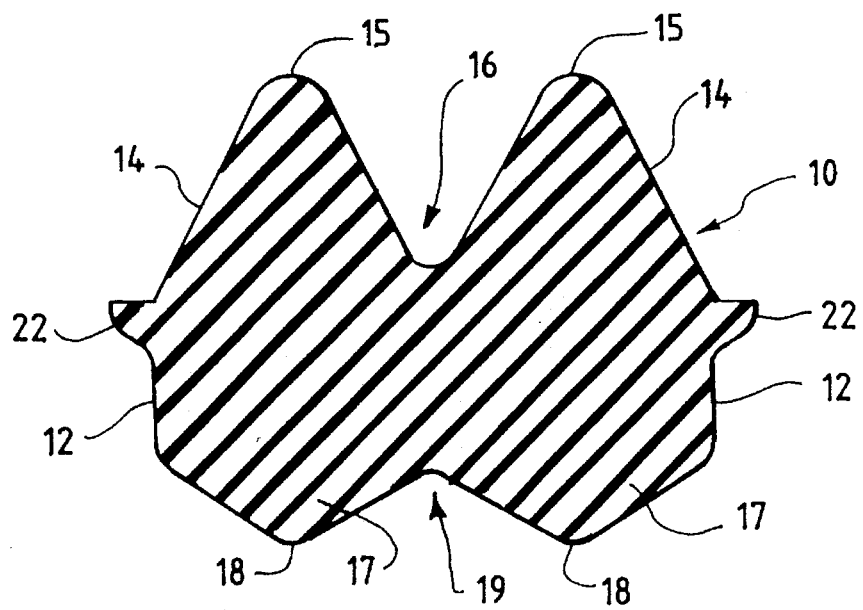
FIG. 2 is an enlarged cross-sectional view of the spaghetti seal of FIG. 1.
Figure 3:
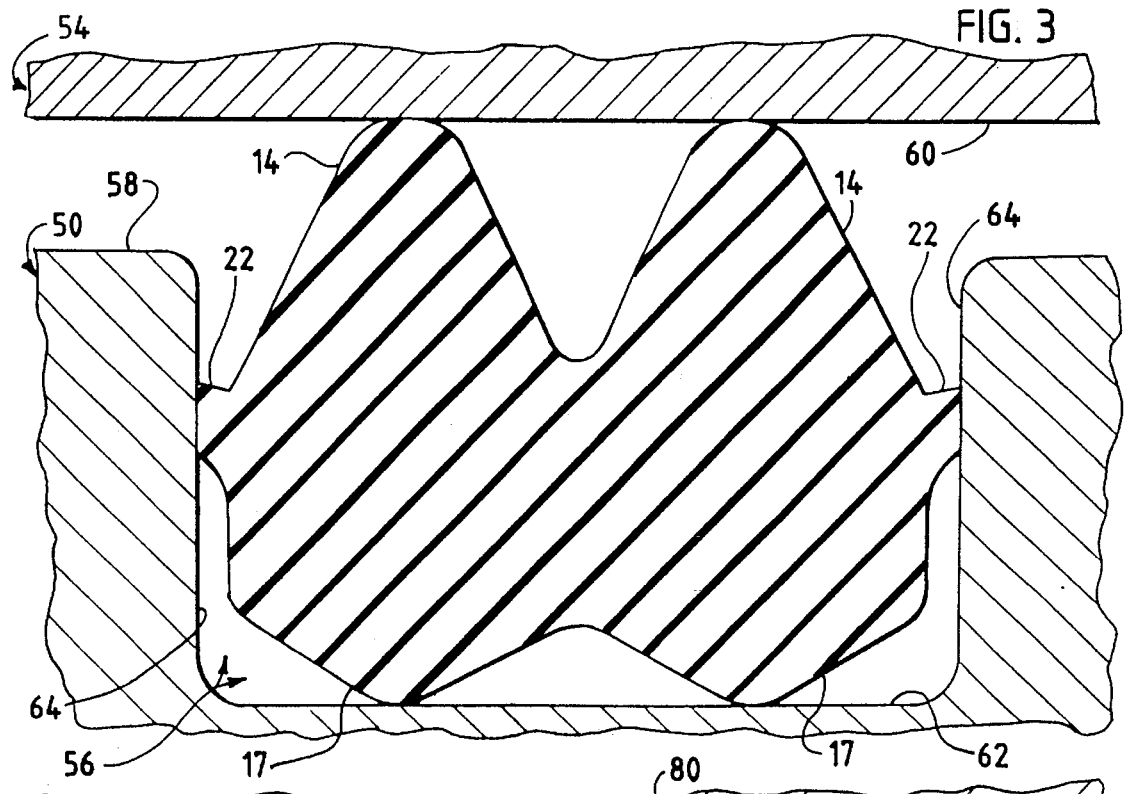
FIG. 3 is an enlarged cross-sectional view of the spaghetti seal of FIG. 1 installed between the flanges of two engine parts prior to loading.
Figure 4:
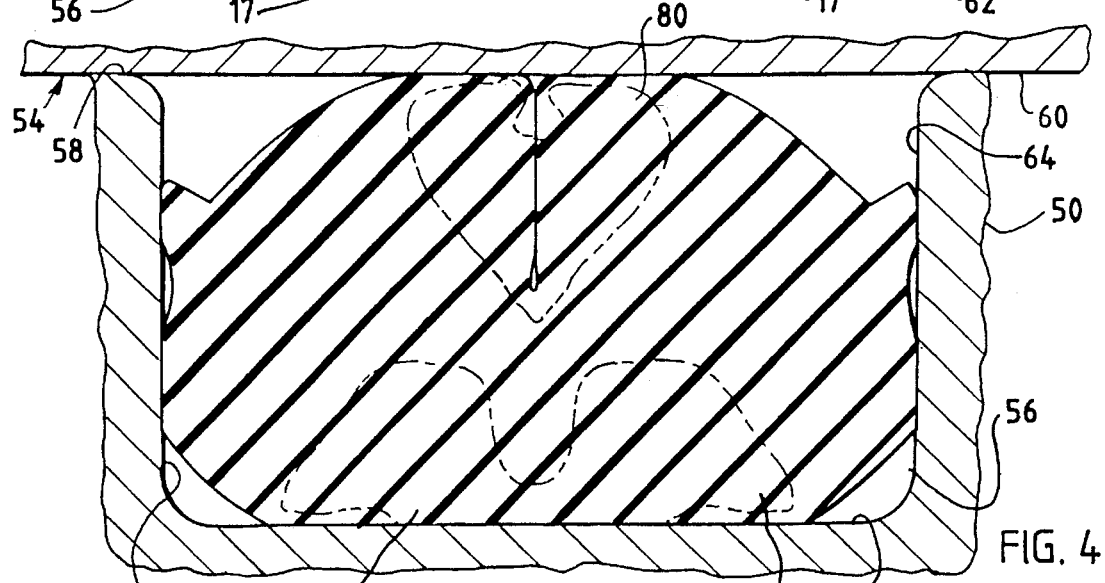
FIG. 4 is an enlarged cross-sectional view of the spaghetti seal of FIG. 3 under loading, illustrating zones of high sealing stress.

As seen in FIGS. 2–4, each side surface 12 of the seal 10 is formed with a sidewardly projecting ear 22. The dimension of the groove between its side surfaces 64 is less than the dimension of the seal 10 between the extremities of ears 22. As such, when the seal 10 is pushed into the groove 56, the ears 22, as they enter the groove, bear against opposite side surfaces 64 thereof. Ears 22 serve to retain the seal in the groove 56, as well as to promote and facilitate inclination of the projecting sealing beads 14 inwardly relative to each other. They cause the projecting beads 14 to pivot relative to each other about the "hinge" region so that their peaks 15 move closer together, reducing the size of the void zone 16. Thus, the projecting seal beads 14 assume a relationship in which they are inclined inwardly relative to each other.

A spaghetti seal as shown in FIG. 2 may have a body width of about 5.08 mm., with each of the ears projecting outwardly therefrom about 0.38 mm. The height of the seal is about 4.19 mm., with the depth of the void zone 16 being about 1.73 mm. and the depth of the void area being about 0.32 mm. The horizontal distances between the peaks 15 and the contact portions 18 are about 2.54 mm. The vertical distances from peaks 15 to the tops of the ears 22 are about 2.03 mm.

Figure 5:
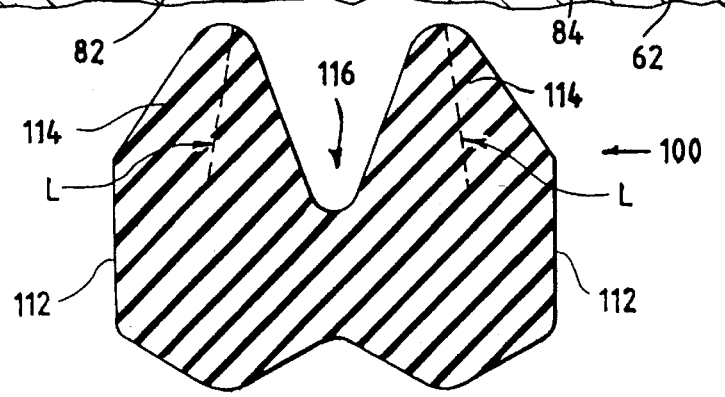
FIG. 5 is an enlarged cross-sectional view of a further spaghetti seal of the present invention.

Other dimensions may be used, and molded in inclinations of the sealing beads, as shown in FIG. 5, may be employed as well.

Eventually as the seal 10 is loaded by a load perpendicular to a plane including the peaks 15 of the beads 14 applied between the confronting engine parts 50, 54, the beads will move in a controlled manner from the inclined positions of FIG. 3 to more inclined positions, thence to a compressed condition in which the beads are forced into contact in an abutting relationship. The feet 17 are also compressed. The beads, when compressed as shown in FIG. 4, behave essentially as a single bead, and provide a region 80 of increased stiffness, thereby to provide a highly effective seal. Similarly, when feet 17 are used and are deflected under compression, the feet also promote regions 82, 84 of high unit stress and stiffness, providing highly effective sealing beneath them in the groove 56. Thus, the elements of the seal together provide a highly effective seal between two engine parts, and much more so than conventional multi-beaded spaghetti seals.

The use of the sealing beads as described also accommodates to variations in the engine part sealing surfaces. For example, where stamped parts are used, they tend to have greater warpage, hence less uniform sealing flanges. To seal such surfaces tends to require a sealing bead of greater height to accommodate a larger gap or zones in which the gap is larger than in other zones. If the bead height is increased, under the load the bead will tend to tilt or otherwise deflect or deform, without compressing in the manner in which it is designed to compress. If that happens, the seal will fail.

By employing the seal of the present invention, namely the pair of beads as described, the pair of beads will tend to be forced towards each other under load and will form a stronger sealing bead. In effect, they will reinforce each other and will tend to act like a single reinforced bead.

In the embodiment of FIGS. 1–4, the ears 22 insure that the seal 10 will fit snugly in the groove 56 and will be retained without the use of adhesive. The ears also serve to pre-tilt the beads 14 so that they lean towards each other. Under load they will gradually lean towards each other at greater angles, eventually forming a single stiff bead to provide adequate sealing stress against the mating surface, while recovery capability will be retained. Of course, before the beads 14 are forced against each other, they act independently, and are very conformable to the mating confronting surface. As such, relatively large variations in the height of the gap to be sealed will be accommodated while preventing tilting or rolling over or other conditions which would cause the seal to fail to function effectively.

Another embodiment of a seal 100 of the present invention is shown in FIG. 5. Seal 100 is similar to seal 10. It includes a pair of side surfaces 112 and a central body portion, together with a pair of sealing beads 114 and a void zone 116 between them. Seal 100 is designed to snugly fit in a groove, such as a groove 56, but to be retained as by the side surfaces 112 of seal 100 in an interference fit with the groove sides.

In the embodiment of FIG. 5, the beads 114 are non-symmetrical and are shaped as molded to incline inwardly towards, and relative to, each other, as illustrated by the lines L, L. Thus no ears are necessary to precondition the beads to incline and gradually form a single bead with the characteristics and attributes described in connection with FIGS. 1–4, although they may be used to enhance retention and to further promote pre-disposition to movement of the beads, under load, into supporting engagement with each other.

Although spaghetti and other elastomeric seals having pairs of sealing beads are known, they do not employ the critical features of the present invention, namely the capacity to use beads having a greater height versus width aspect, and which cooperate to form a single bead mutually supported by the pair of beads to provide a single, high stress sealing bead. The means for inclining the beads accomplish this, and it is the hinge effect which promotes this ability of the pair of beads to form the single high stress bead.

The spaghetti seal of the present invention may be used in a wide variety of environments such as where spaghetti seals are commonly employed at present. Such applications include crank case ventilation housings, air/oil separators, rocker covers and oil pans, among others including those in non-engine environments.

From the foregoing it will be apparent to those skilled in the art that modifications may be made without departing from the spirit and scope of the present invention. Accordingly, the invention is not intended to be limited except as may be made necessary by the appended claims.

What is claimed is:

1. A sealing assembly comprising a spaghetti seal having an elongated elastomeric body seated and retained in a groove defined in a flange of a first part to be sealed to a second part, said groove opening at a surface of said first part and adapted to face said second part, said groove having a bottom surface and side surfaces, said elastomeric body having a central body portion and side surfaces, said body side surfaces bearing against said groove side surfaces, a pair of integrally formed side-by-side upwardly projecting sealing beads of similar size and shape extending upwardly from said central body portion and extending along the length of said body, each of said sealing beads having a peak extending outwardly beyond the surface of said first part with a first elongated void zone lying between said upstanding sealing beads and along the length of said body, said central body portion confronting and engaging said bottom surface of said groove, and wherein when said seal is loaded by a load applied to said first and second parts said beads incline inwardly towards each other to promote movement of said beads into contact with each other to increase the stiffness of the seal in its zone of contact with said second part.

2. A sealing assembly in accordance with claim 1, and wherein said projecting sealing beads are shaped as molded to incline inwardly relative to each other.

3. A sealing assembly in accordance with claim 1, and wherein each of said elastomeric body side surfaces defines a sidewardly projecting ear bearing against opposite groove side surfaces both to retain said seal in said groove and to incline said projecting sealing beads inwardly relative to each other.

4. A sealing assembly in accordance with claim 1, and wherein said elastomeric body, in the regions of said voids, functions as a hinge so that under load said sealing beads shift into contact with each other to increase the stiffness of the seal.

5. A sealing assembly in accordance with claim 4, and further comprising a pair of side-by-side feet extending downwardly from said central body portion and engaging said bottom surface of said groove, said feet defining between them a second elongated void area, said second void area being vertically aligned with said first void zone.

6. A spaghetti seal comprising a elongated elastomeric body adapted to be seated and retained in a groove defined in the flange of a first engine part to be sealed to a second engine part, said groove opening at a surface of said first engine part and adapted to face said second engine part, said elastomeric body having a central body portion and side surfaces, said body side surfaces being adapted to bear against side surfaces of said groove, a pair of integrally formed side-by-side upwardly projecting sealing beads of similar size and shape extending upwardly from said central body portion and extending along the length of said body, each of said sealing beads having a peak extending outwardly beyond the surface of said first engine part with a first elongated void zone lying between said upstanding sealing beads, said projecting beads being inclined inwardly relative to each other, and said central body portion defining a pair of side-by-side downwardly extending feet and defining between them a second elongated void area, said second void area being vertically aligned with said first void zone.

7. A spaghetti seal in accordance with claim 6, and wherein said projecting sealing beads are shaped as molded to incline inwardly relative to each other.

8. A spaghetti seal in accordance with claim 6, and wherein each of said elastomeric body side surfaces defines a sidewardly projecting ear positioned to bear against opposite groove side surfaces both to retain said seal in said groove and to promote inclination of said projecting sealing beads inwardly relative to each other.

9. A spaghetti seal in accordance with claim 6, and wherein said elastomeric body, in the regions of said voids, facilitates inclination of said sealing beads relative to each other under load and into contact with each other to increase the stiffness of the seal.

* * * * *